United States Patent [19]

Boissier et al.

[11] Patent Number: 4,707,002

[45] Date of Patent: Nov. 17, 1987

[54] METHOD AND DEVICE FOR CONNECTING A SUBMERSIBLE ELEMENT TO AN ENCLOSURE UNDER VERY HIGH PRESSURE

[75] Inventors: André Boissier, Fontainebleau; Jean Chabat-Courrede, Moret S. Loing; Michel Decaudin, Cannes Ecluse, all of France

[73] Assignee: Electricite de France (Service National), Paris, France

[21] Appl. No.: 573,797

[22] Filed: Jan. 25, 1984

[30] Foreign Application Priority Data

Feb. 4, 1983 [FR] France ................. 83 01757

[51] Int. Cl.$^4$ .............................. F16L 19/03
[52] U.S. Cl. ................. 285/334.2; 285/353; 285/341; 376/203
[58] Field of Search ............. 285/334.2, 334.4, 341, 285/353, 384, 389, 141; 376/203

[56] References Cited

U.S. PATENT DOCUMENTS

| 327,982 | 10/1885 | Anthony et al. | 285/341 |
| 502,665 | 8/1893 | Friede | 285/334.2 |
| 956,294 | 4/1910 | Corcoran | 285/334.2 |
| 1,426,724 | 8/1922 | Fyffe | 285/334.2 |
| 1,455,731 | 4/1923 | Kelly | 285/141 |
| 2,022,529 | 11/1935 | Townsend | 285/141 |
| 2,287,142 | 6/1942 | Simmonds | 285/353 |
| 2,766,999 | 10/1956 | Watts et al. | 285/341 |
| 3,210,098 | 10/1965 | Watts | 285/334.2 |
| 3,722,925 | 3/1973 | Robbins | 285/341 |

FOREIGN PATENT DOCUMENTS

| 1208423 | 1/1966 | Fed. Rep. of Germany | 376/203 |
| 1310820 | 10/1962 | France | 376/203 |
| 489513 | 6/1955 | Italy | 285/334.2 |
| 11029 | 4/1975 | Japan | 376/203 |
| 179690 | 9/1985 | Japan | 376/203 |
| 1048790 | 3/1986 | Japan | 376/203 |
| 1047587 | 3/1986 | Japan | 376/203 |
| 58346 | 8/1937 | Norway | 285/353 |
| 254619 | 7/1926 | United Kingdom | 285/384 |
| 416733 | 9/1934 | United Kingdom | 285/384 |
| 2056607 | 3/1981 | United Kingdom | 285/334.2 |
| 2060105 | 4/1981 | United Kingdom | 285/341 |

Primary Examiner—Cornelius J. Husar
Assistant Examiner—Eric K. Nicholson
Attorney, Agent, or Firm—Ladas & Parry

[57] ABSTRACT

The invention relates to a device for connecting a cylindrical or tubular submersible element to a tubular sleeve, inter alia a submersible heating element to the sleeve of a pressurizer basin, comprising a first flange associated with the sleeve, a second flange associated with the submersible element, a resilient metal joint interposed between the two flanges, two screwthreaded tubular members, one male, the other female, which cooperate with one another via their threads, the threaded male member acting on the first flange via the agency of two half-rings, the female screwthreaded member acting on the second flange, the screwing of the two screwthreaded tubular members causing the compression of the joint. It is characterized in that the joint comprises a T section, the flanges each having an end bearing surface and a frustoconical bearing surface cooperating respectively with the main member and crossbar of the T, the second flange comprising a thrust shoulder at one end of the connecting device, and the male screwthreaded element comprising a thrust edge at the other end of the joint, so that the joint can be precompressed by tightening the two elements and bringing them together.

2 Claims, 6 Drawing Figures

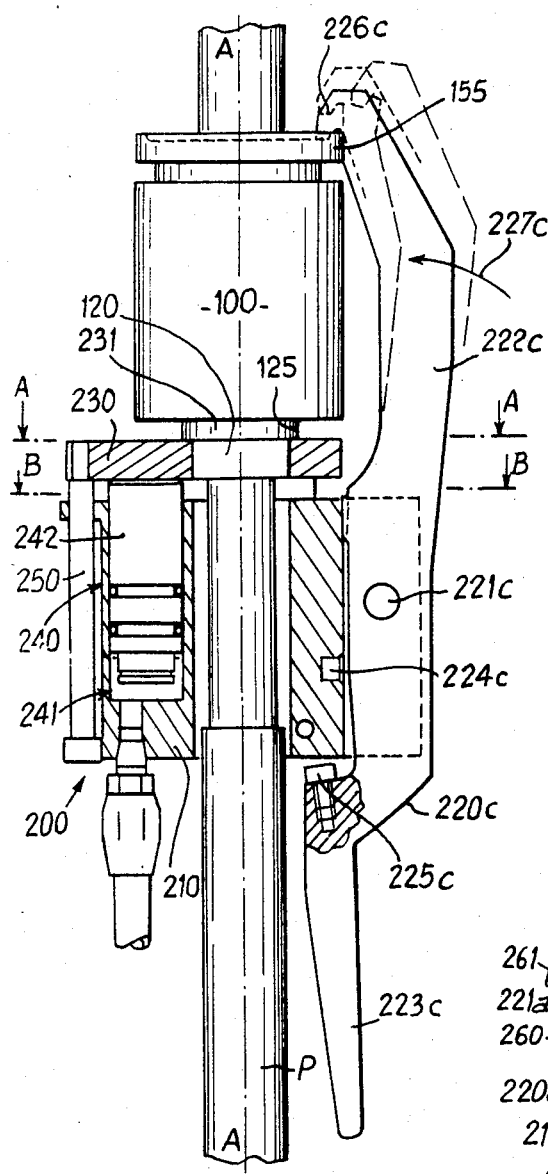
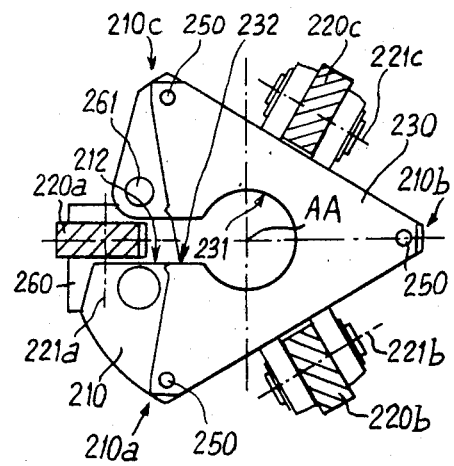
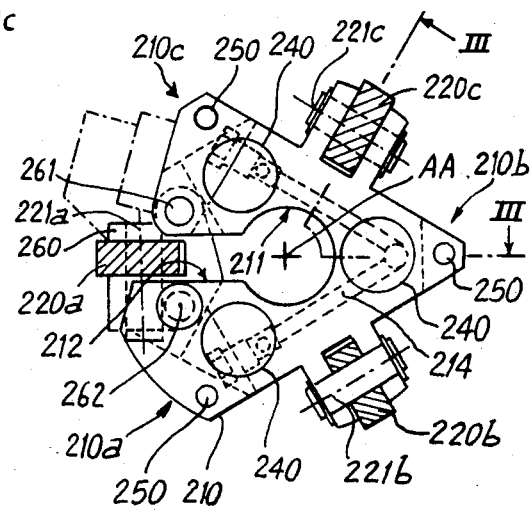
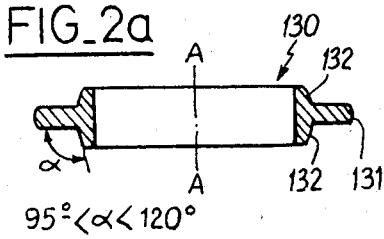

METHOD AND DEVICE FOR CONNECTING A SUBMERSIBLE ELEMENT TO AN ENCLOSURE UNDER VERY HIGH PRESSURE

FIELD OF INVENTION

This invention relates to a device for connecting a cylindrical or tubular element to a tubular sleeve, a method for installing or removing said connecting device, and a jack for use in the installation and removal of said connecting device.

BACKGROUND OF THE INVENTION

It is known that the pressure of the primary circuit of pressurized water nuclear power stations can be controlled in part, by submersible heating elements ("heating rods") disposed in the bottom part of the pressurizer, which usually takes the shape of a steel basin through the end of which vertical heating elements extend. For this purpose the end comprises a series of vertical tubular sleeves in which the heating elements can engage.

The technological difficulty of the problem is due to the fact that the pressurizer enclosure on which the submersible heating elements must be mounted via the agency of the sleeves operates at high pressures (of the order of 170 bar) and at elevated temperatures (which can go up to 350° C.).

In the first pressurized water nuclear power stations set up in France, the metal submersible heating elements were welded to the sleeves, and this method was satisfactory as regards sealing-tightness and durability. However, such a method clearly has disadvantages in operation: it is a lengthy and expensive matter to remove a heating element, either for inspection or replacement, since the existing weld must be destroyed (possibly damaging the sleeve) and a new weld must be made. It will also be noted that the time during which action is taken cannot be prolonged indefinitely without serious disadvantages, since the pressurizer is 'hot' and operatives carrying out the work are therefore subjected to irradiation. Moreover, such work (destroying the weld and then rewelding) requires a fresh hydraulic test under the regulations in force, since the integrity of the pressurized envelope has been 'modified' by the welding.

In these conditions it seemed infinitely desirable to be able to install and remove the submersible heating elements in the sleeves quickly and without adverse effect on the sealing-tightness of the assembly, the integrity of the sleeve being ensured throughout.

There are numerous removable connecting assemblies which solve the problem of sealingly mounting a tube in a sleeve. More particularly screwed connections are known whose tightening compresses a joint.

In this respect the tests carried out by the Applicants with connecting assemblies of this kind proved to be ineffective, since due to the pressures involved, very high tightening torques are required, which may twist the sleeve.

It is an object of the invention to provide a connecting device which can be quickly installed and removed, and, above all provides an effective seal even at very high temperatures and pressures.

It is a further object of the invention to provide a method of installing and removing the said connecting device in such a manner that negligible torque is transmitted to the sleeve.

It is a further object to provide a prestressing jack for use with the connecting device of the invention.

SUMMARY OF THE INVENTION

The invention provides in or for use in the connection of a cylindrical or tubular element to a tubular sleeve, a device of the type which comprises:
 (a) a first flange connectable to one of the tubular sleeve and the cylindrical or tubular element,
 (b) a second flange connectable to the other of said tubular sleeve and the cylindrical or tubular element,
 (c) a resilient metal sealing joint interposed between said first and second flange,
 (d) a tubular male screwthreaded member acting on said first flange,
 (e) a tubular female screwthreaded member acting on said second flange, and threadedly cooperating with said male screwthreaded member whereby relative rotation of said male and female screwthreaded members causes the compression of said metal sealing joint. the improvement comprised in that:
 (f) the joint comprises a T section;
 (g) the first and second flanges each have an end bearing surface and a frustoconical bearing surface which cooperate respectively with the main member and crossbar of the T;
 (h) the second flange is provided with a thrust shoulder adjacent one end of the connecting device, and
 (i) the male screwthreaded member is provided with a thrust edge adjacent the other end of said connecting device, said joint being compressible by the application of axial pressure to the thrust shoulder on said second flange and the thrust edge on said male screwthreaded member.

Preferably, the underside of the crossbar of the T is inclined to the main member of the T at an angle between 95° and 120°.

Preferably, the radial outer edge of the male screwthreaded member is aligned with the radial outside wall of the female screwthreaded member.

Advantageously, the device includes two half rings interposed between the male screwthreaded member and the first flange.

The present invention also provides a method of installing or removing a connecting device in accordance with the invention, which method includes the step of urging said first and second flanges together by applying axial force to the thrust shoulder of the second flange and the thrust edge on said male screwthreaded member, thereby allowing said female screwthreaded member to be freely threaded onto said male member without the application of appreciable torque to said tubular sleeve.

Preferably the axial force is applied by a prestressing jack which preferably comprises:
 (a) a base;
 (b) a thrust, reaction member, and
 (c) thrust assemblies actuable to move said thrust reaction member, away from said base; wherein said base and said reaction member have aligned appertures through which, in use, the cylindrical or tubular element extends, and wherein said prestressing jack further comprises:

(d) latching levers said thrust reaction member being adapted to engage, in use, with said thrust shoulder of the second flange, and the latching levers being adapted to engage with the thrust edge on said male screwthreaded member.

Preferably the jack also includes lateral slots allowing, in use, the lateral introduction of the jack, onto said cylindrical or tubular element.

Advantageously the prestressing jack further comprises (e) a closure element mounted to pivot on the jack to open or close the slots; and (f) means to lock said closure element on said base in a closed position.

Preferably, the base and the reaction member are of generally triangular shape, and there are three thrust assemblies uniformly distributed around the axis of the jack.

The cylinders are preferably supplied with fluid, for example, oil, at a pressure such that the force of the jack is several thousand daN.

Preferably, the prestressing jack further comprises spring means biasing said levers to the latching position.

Advantageously, said levers terminate in operating handles manually actuable to release said levers from their latching position.

The invention will be more clearly understood from the following description and accompanying drawings to which it refers; the features appearing in the description or drawings of course form an integral part of the present invention.

BRIEF DESCRIPTION OF DRAWINGS

FIG. 2a shows the joint of the connecting device in FIG. 2, in axial cross section, FIG. 3 shows in accordance with the sectional half planes III—III in FIG. 3b the mounting of the connecting device illustrated in FIG. 2 by means of a special jack, FIG. 3a is a plan view in accordance with the arrow A—A in FIG. 3, FIG. 3b is a sectional view, taken along the line B—B in FIG. 3.

DETAILED DESCRIPTION OF PREFERRED EMBODIMENT

Figure 1:
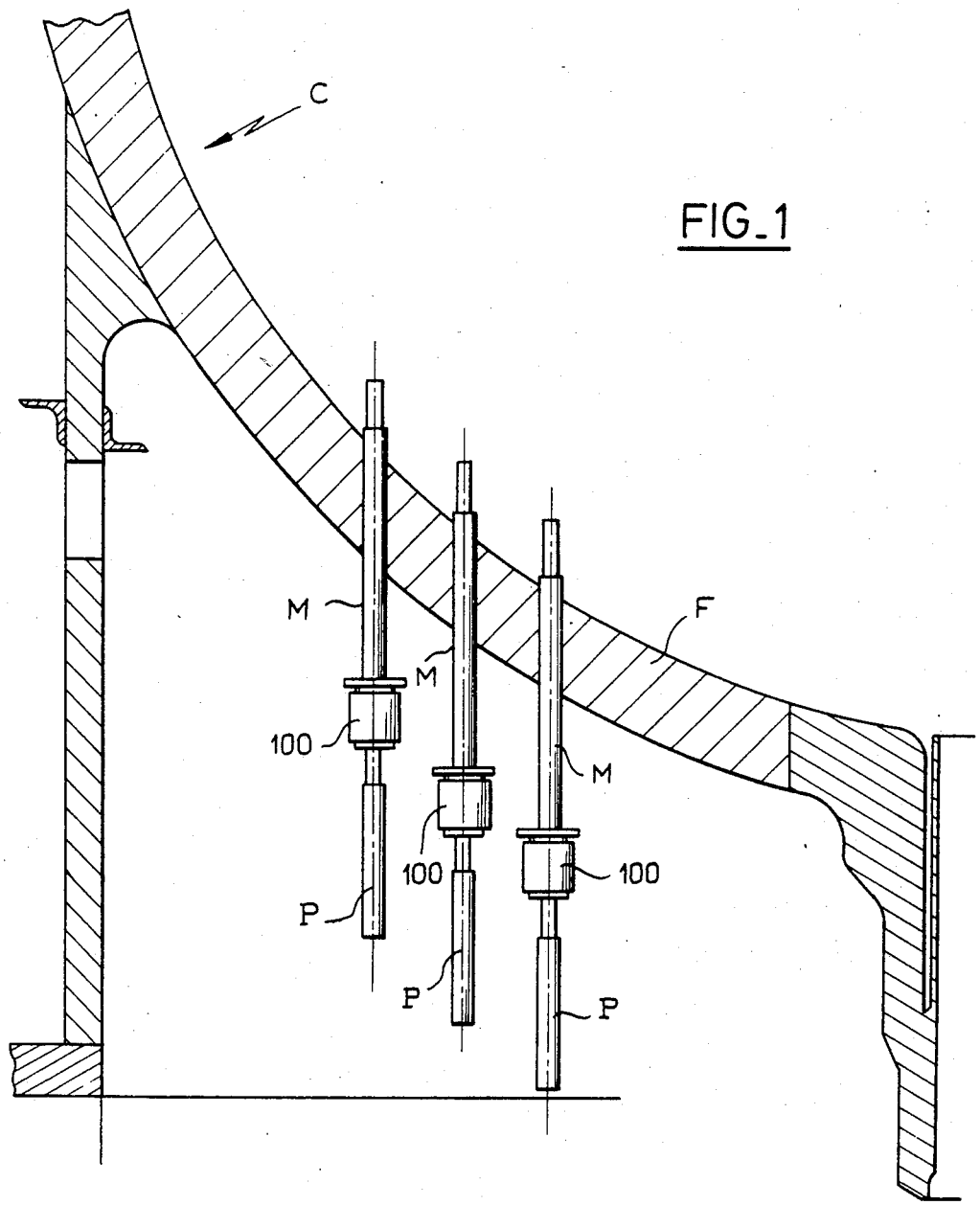
FIG. 1 is a vertical section showing a plurality of heating elements on a pressurizer.

FIG. 1 shows a steel basin C of a pressurizer. An enclosure of this kind is filled with water at an operating pressure of 170 bar and temperatures exceeding 300° C.

The end F of the pressurizer has tubular metal sleeves M welded to the basin. As a rule, and as shown, the sleeves M are disposed in groups, for example, in groups of 7 adjoining sleeves. The working space around each of the sleeves is therefore not very large.

Submersible heating elements P are introduced into the sleeves M and extend into the pressurizer basin C.

In the prior art such heating elements were welded by their metal outer jackets to the metal sleeves M. Clearly, it is a difficult and relatively laborious operation to install and remove such a welded element, while the personnel carrying out the operations are subjected to appreciable radiation.

It is therefore extremely desirable in practice to have a removable connecting system available for replacing the welds. The system must be easy and quick to use during both installation and removal and must be reusable. Above all, it must remain perfectly seal tight in spite of the aforementioned high pressures and temperatures.

The Applicants carried out numerous studies, finally developing on the one hand a particularly advantageous screwed connection structure and on the other hand a method of installation and removal specific to such a connection.

Figure 2:
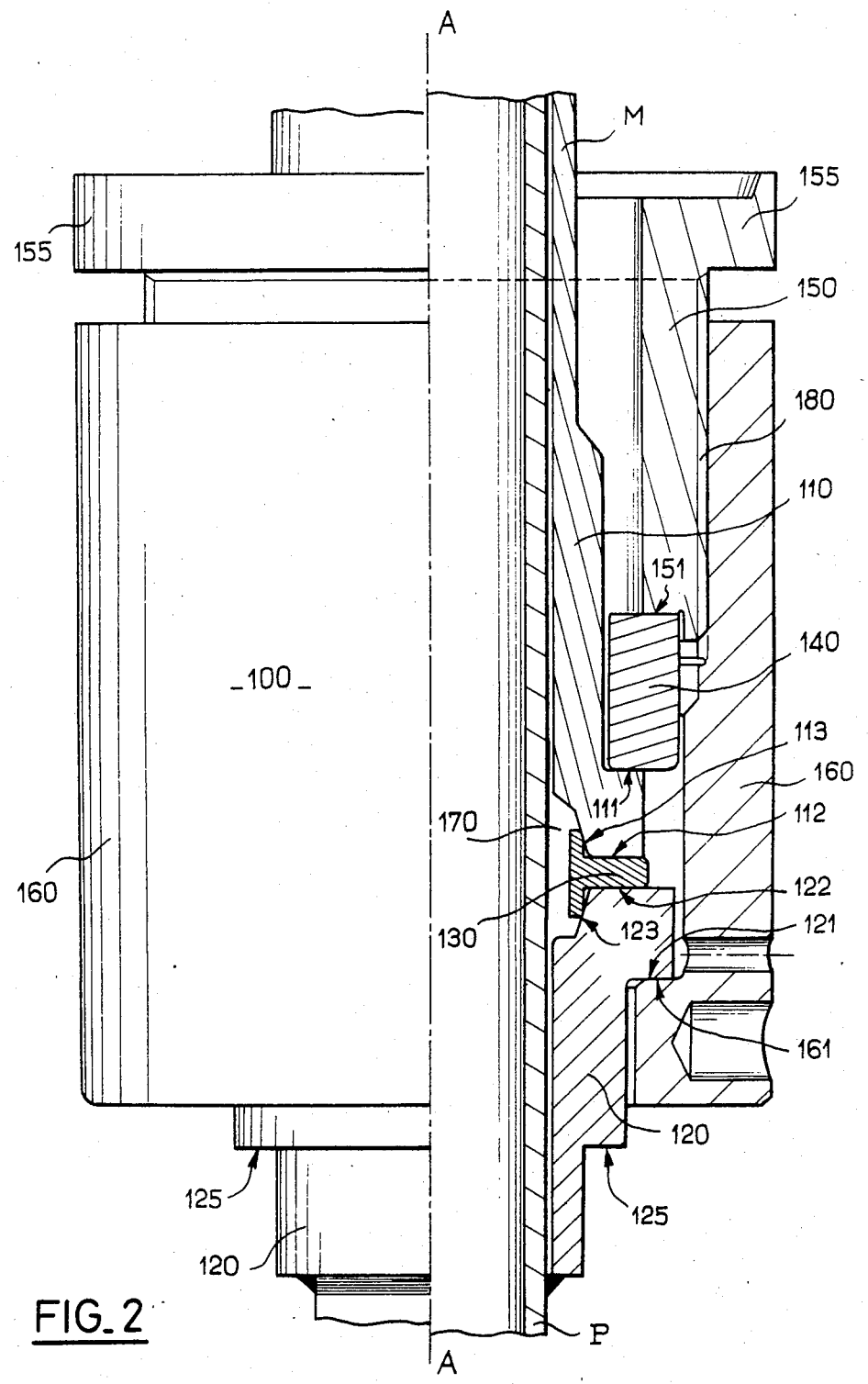
FIG. 2 shows, half in side elevation and half in axial section, a connecting device according to the invention.

FIG. 2 shows the connecting assembly according to the present invention. This assembly 100, of revolution around the central axis A—A of the sleeve and the submersible element which it must unite fundamentally comprises a flange 110 connected fast to a sleeve M, a flange 120 connected fast and sealing tight, for example by welding, to a submersible element P, a sealing joint 130 interposed between the two flanges, two thrust half-rings 140 cooperating with the flange 101 via its shoulder 111, a male screwing element 150 bearing via a shoulder 151 against the thrust half-rings 140, and a female screwing element or nut 160 cooperating with the first element by bearing via its shoulder 161 against a shoulder 121 of the sleeve 120. In detail, it can be seen that the two flanges 110 and 120 have an end bearing-surface, perpendicular to the axis A—A (112,122), prolonged by a frustonconical bearing surface (113,123) slightly inclined, for example, by about fifteen degrees to the axis A—A. A joint 130 (FIG. 2a) is of general T-shaped section, with a central member 131 and two lateral arms 132.

The central member 131 is engaged between the two end bearing surfaces 112 and 122. The two arms 132 cooperate with the frustoconical bearing surfaces 113 and 123 of the two flanges 110 and 120. When the two flanges are clamped in the direction of the axis A—A, sealing-tightness is ensured at one and the same time by the axial clamping of the end bearing surfaces 112 and 122 on the main body 131, and by the sealing effect of the arms 132 on the bearing surfaces 113 and 123 (radial clamping). It will be noted that the shape of the flanges 110 and 120 on the side of their end in contact with the joint creates a chamber 170 forming a shallow basin in which the projecting portion of the joint 130 (arms 132 forming the crossbar of the T) is mounted.

All the members of the connecting assembly according to the invention, including the joint 130, are of metal (preferably steel) and are members of revolution around the central axis A—A of the sleeve M and the submersible element P entering such sleeve. The screwthreaded male member 150 and the nut or female member 160 cooperate via a screw thread 180. The screwthreaded member 150 has a latching and thrust edge 155 at one end of the connection, while at the other end the flange 120 has a thrust shoulder 125.

It is easy to understand how such an assembly operates: the screwing of the nut 160 on to the thrust edge 155 brings the two members together, entraining on one side the flange 120 and on the other side the two half-rings 140 and the flange 110, so that the two flanges 110 and 120 more together and tighten the joint 130, thus ensuring sealing-tightness, as already stated, by axial movement which induces radial clamping.

It will be noted that the main feature of the invention resides in the particular shape of the joint 130 and its surfaces cooperating with the end bearing surfaces (112,122) and frustoconical bearing surfaces (113,123).

The Applicants tried out numerous kinds of joints, and only the aforementioned joint in the aforementioned arrangement gave satisfaction, both as regards sealing-tightness, performed by end bearing surfaces and frustoconical bearing surfaces, and as regards the important resilient return of the sealing lips, although the axially clamping force is not very high.

Three series of tests will now be described which illustrate the behaviour of such a system.

First Series of Tests

Checking resilient return, 10 cycles were carried out on a press, the results being satisfactory.

Checking the connection/joint mechanical behaviour:

24 complete installations and removals of the sections of the same joint.

Checking sealing tighteness:

During these 24 tests sealing tighteness was checked after each new installation. No leakage was detected.

Checking in thermal cycles:

20 thermal shocks were carried out on the connection/joint assembly with a $\Delta\theta$ of 230° C. in 3 minutes for the last tests.

Checking sealing-tightness:

No leakage was discovered during the thermal shock tests.

Final removal.

The assembly of members was in a perfect condition.

Second Series of Tests

This time the tests were carried out on a joint whose conical sealing bearing surfaces had substantially the maximum tolerances permitted by the constructor; this was to check the behaviour of such a connection of the joint assembly at the limit of acceptable values.

Checking of cold mechanical behaviour and mounting with brand new joint.

Checking in thermal cycles;

22 thermal cycles were carried out with a $\Delta\theta$ of 175°-200° C./hour.

Checking in pressure cycles:

Associated with the thermal cycles, rapid pressure variations of an amplitude of 140 bar.

Checking sealing-tightness:

In the 10th cycle before removal and after installation the same assembly: sealing-tightness satisfactory.

After the 22nd cycle: sealing tightness satisfactory.

Final removal:

Satisfcatory behaviour of the connecting members assembly. No trace of leakage was found.

Third Series of Tests

The object of this test was to determine the safety margin (the pressure at which loss of sealing tightness occurs).

The connection/joint assembly was placed in a stove at a temperature of 320° C. for 100 hours.

During that period the connection was subjected to variations in pressure (from the nominal pressure of 156 bar to 310 bar—i.e., twice the operating pressure) with a transition to 300 bar at a temperature of 332° C.

From this series of tests we can conclude that the connection tested has a safety margin of at least 100% of the operating pressure for a temperature of 300° C.

When the nut 160 is screwed on to the matching male member 150 it is essential to inhibit torque being transmitted to the sleeve M.

This problem is solved according to the invention by precompressing the connecting device during mounting.

In other words before the screwing or unscrewing operation, the two flanges 110 and 120 are brought together and the joint 130 is compressed; this allows a screwing or unscrewing operation with very low torque, so that the sleeve M remains substantially untwisted.

Having regard to the small amount of space available around each sleeve, as has been pointed out, a special duly adapted system must be provided which forms part of the invention. This is primarily a jack 200, shown in FIGS. 3, 3a, 3b.

The jack 200 fundamentally comprises a base 210 having pivoting levers 220 for latching to the connection, a thrust reaction member 230, thrust assemblies 240 (i.e., actuators) being interposed between the base 210 and the thrust reaction member 230 and guide rods 250 for guiding the relative movement of the thrust reaction member 230 and the base 210. These various elements will now be described in greater detail.

As can be seen more particularly in FIG. 3b, the base 210 is of substantially triangular section, with three corners 210a, 210b, 210c uniformly distributed around the central axis A—A (which is also the central axis of the connection assembly and submersible element on which the jack is adapted to be used). At its centre the base has a circular traversing apperture 211 which is accessible laterally, opposite the corner 210b, via an axial slot 212. Disposed in line with the three corners 210a, 210b, 210c are three thrust assemblies 240 each formed by a cylinder 241 containing a piston 242. The thrust assemblies 240 are supplied by means of a hydraulic circuit 214 on which the cylinders 241 are mounted in parallel; a source of fluid, for example, pressurized oil, (not shown) can be connected to the supply circuit 214. The reaction member 230 shown more clearly in FIG. 3a, has, like the base 210, a central apperture 231 on axis A—A and an access slot 232. The thrust reaction member 230 moves in relation to the base 210 on vertical tie rods 250 (see FIG. 3 and FIG. 3a), so that the relative movement apart or together (parallel with the axis A—A) is properly guided.

The aforementioned access slots 210 and 232 provided on the base 210 and thrust reaction member 230 respectively enable the jack to be introduced laterally on to a connecting system 100.

However, in order to reinforce the jack while not making it heavier, a closure element 260 can be provided which is mounted to pivot on the jack, more precisely on the base adjacent the access slots 212 and 232, around an axis 261 perpendicular to the base and reaction member. The closure element 260 is adapted to be 'locked' on the base 210 in the slot closure position by, for example, a detachable pin 262 extending perpendicularly through the base 210 and also through the closure element 260. In FIG. 3b the closure element is shown in the open position by chain lines and in the closed position by continuous lines.

The object of such a closure element 260 and its pin 262 is to close the base around the connecting system to avoid any risk of undesirable deformation by the opening thereof during the operation of the jack. Of course, an arrangement of this kind enables the prestressing force applied to the connecting system to be increased.

Clearly, when fluid, for example, pressurized oil, is supplied to the cylinders 241, the pistons 242 tend to move with reaction member plate 230 away from the base 210, the elements being brought together by relaxing the pressure under the force of springs (not shown).

Laterally the base 210 supports in its upper part three pivoting levers 220a,220b,220c mounted to pivot around axes 221a,221b,221c corresponding with the sides of the base (FIGS. 3a and 3b). The three pivoting levers are of identical structure. The structure of lever 220c (FIG. 3) will be described.

The lever comprises a central portion 222c articulated substantially at its centre to the pivot 221c. At its lower end the central portion 222c is extended by an operating handle 223c. A spring 224c, partly received in the base 210, always tends to make the lever 220c pivot in the direction indicated by arrow 227c. On the other hand, an end-of-travel stop 225c cooperates with the base to limit the displacement of the lever 220 against the force of the spring as the result of the manual control urging the handle 223c towards the axis A—A. Lastly, in its upper part the lever 220c has a latching claw 226c.

A jack 200 of this kind operates as follows. The object is to prestress a connecting system 100 mounted on a vertical submersible element P in surroundings of the kind shown in FIG. 1 (a forest of vertical elements one beside the other). To simplify the explanation, we shall suppose that the connections 100 are of the kind shown in FIG. 2, although it must be understood that as regards prestressing using a jack, the invention applies to any connecting system having a compressible resilient joint (of the kind of the joint 130), a latching edge (of the kind denoted by reference 155 in FIG. 2) and a thrust shoulder (of the kind denoted by reference 125 in FIG. 2).

In this context the operation of the jack 200 first comprises the lateral introduction of the jack (via the slots 212-232) so that its axis coincides with the axis A—A of the connecting assembly 100. Once this axial position has been reached, the operator closes the element 260 and locks it by the pin 262, when such are provided then raises the jack 200 along the axis A—A, while keeping the three handles 223a,223b,223c clamped against the force of their loading springs (224a,224b,224c). The jack 200 is not supplied with pressurized fluid. The rising movement continues until the apperture 231 of the reaction plate registers with the flange 120 and abut its shoulder 125. The reaction plate 230 is brought as close as possible to the base 210 and the latching claws 226a,226b,226c come to a level very slightly higher than that of the edge 155. The handles 223a,223b,223c are relaxed so that the claws 226a,226b,226c, after the pivoting of the levers 220a,220b,220c hook over the edge 155, which is vertically above the wall of the nut 160.

When the thrust assemblies 240 are pressurized they tend to move the reaction member 230 and the base 210 away from one another. Since the reaction member is applied to the shoulder 125 of the flange 120, and the levers 220a,220b,220c cooperate via their latching claws with the edge 155 of the screwthreaded male element 150, this movement apart tends to compress the joint 130, which is engaged between the flange 120 on the one hand and the flange 110 on the other, the latter being acted upon by the two half-rings 140 as a result of the entrainment of the member 150. It can be seen that the actuation of the jack 200 results in a precompression (or prestressing) of the joint which is kept, of course, at a suitable value (the axial force transmitted to the connection must be a few thousand daN).

In this state of precompression it is easy to screw the nut 160 onto the member 150 into its final position, without having to supply any great torque, and therefore without transmitting any torque to the sleeve M. Such an operation is very fast, precisely because light manual force suffices.

In practice the application of joints of the kind shown in FIG. 2 by means of the hydraulic jack described has produced remarkable results as regards the reliability and rapidity of the operation of connecting heating elements to the sleeves of a pressurizer. Of course, the jack is also advantageously used for dismantling the connections. In all cases the precompression of the joint 130 precedes the operation of the nut 160.

What is claimed is:

1. A device for connection of a cylindrical element to a tubular sleeve, comprising
   a first flange connected to the tubular sleeve,
   a second flange connected to the cylindrical element,
   a resilient metal sealing joint having T-shaped cross-sectional configuration being interposed between said first and second flanges,
   said first and second flanges each having a main end bearing surface and a secondary frustroconical bearing surface cooperating respectively with a main member and a cross bar of the T-shaped sealing joint,
   a tubular male screwthreaded member having a thrust shoulder engaging an associated thrust shoulder being provided on said first flange through a ring member,
   a tubular female screwthreaded member screwed onto said tubular male screwthreaded member and having a thrust shoulder adapted to engage a first thrust shoulder provided on said second flange,
   said second flange having a second thrust shoulder at one end of the device,
   said tubular male screwthreaded member having a latching edge at the other end of the device,
   said latching edge on said tubular male screwthreaded member and said second thrust shoulder on said second flange being adapted to receive a high external axial pressure by means of a tool so as to compress said joint substantially axially and without securing said tubular female screwthreaded member against rotation, said tubular female member being screwed onto said tubular male screwthreaded member without imparting any substantial torque to said tubular sleeve until said thrust shoulder on said tubular female screwthreaded member engages with said first thrust shoulder on said second flange and maintains said device in a compressed condition.

2. A device as claimed in claim 1 wherein said second thrust shoulder on said second flange is provided on an axial extension of said flange radially between said tubular female screwthreaded member and said cylindrical element and beyond an end surface of said tubular female screwthreaded member.

* * * * *